(No Model.)
J. KREHBIEL.
STREET CAR SEAT.
No. 535,168. Patented Mar. 5, 1895.
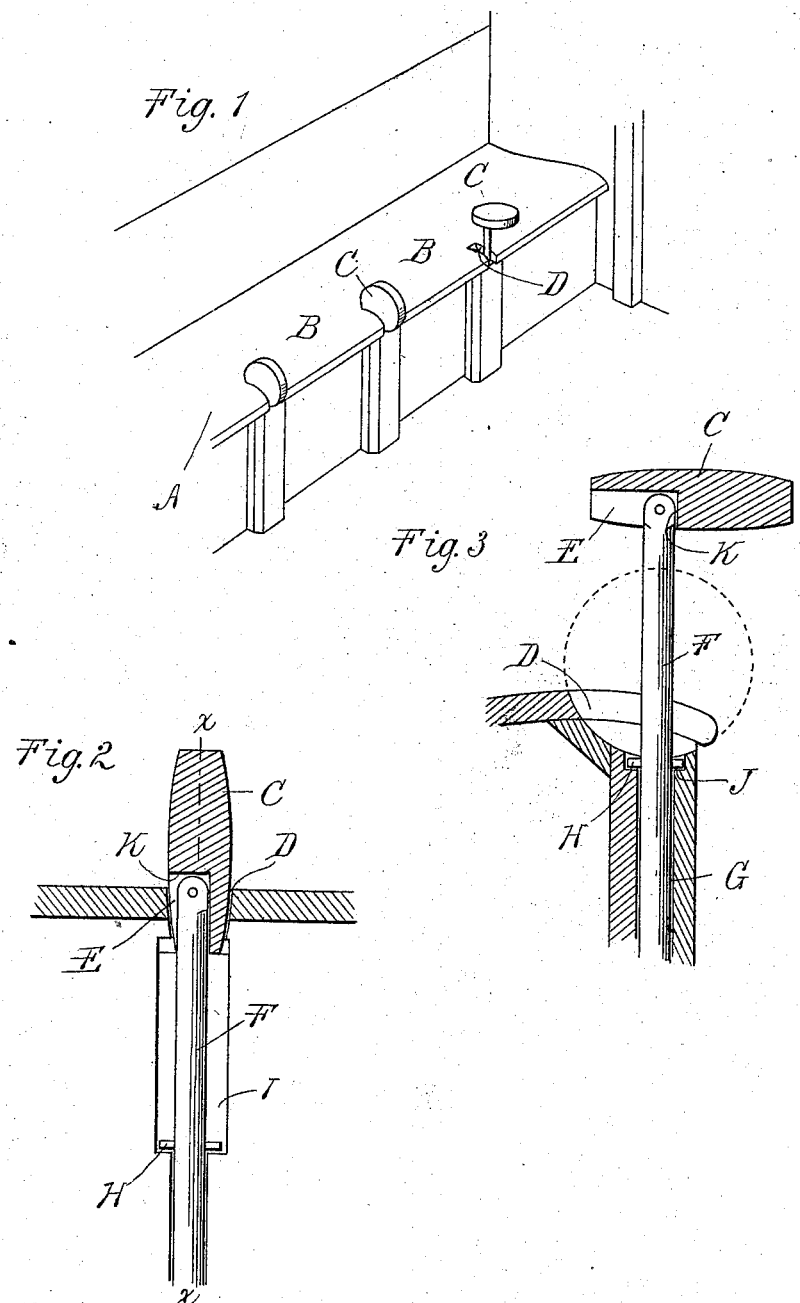
Witnesses:
P. M. Hulbert
[signature]
Inventor:
John Krehbiel
By [signature] Attys.

UNITED STATES PATENT OFFICE.

JOHN KREHBIEL, OF CLEVELAND, OHIO.

STREET-CAR SEAT.

SPECIFICATION forming part of Letters Patent No. 535,168, dated March 5, 1895.

Application filed March 26, 1894. Serial No. 505,117. (No model.)

*To all whom it may concern:*

Be it known that I, JOHN KREHBIEL, a citizen of the United States, residing at Cleveland, in the county of Cuyahoga and State of Ohio, have invented certain new and useful Improvements in Street-Car Seats, of which the following is a specification, reference being had therein to the accompanying drawings.

The invention consists in the peculiar construction of an auxiliary or supplemental seat adapted to give additional sitting room in the ordinary street cars, by providing an extra seat between the usual seatings of the longitudinal seats; further in the peculiar construction of this seat whereby it may be used to form an arm rest or the division between the seats when out of use, and whereby it may be raised and locked in its raised position when it is desired to be used, thus practically doubling the seating capacity of the ordinary car, available when the car is crowded and which may be stowed away without occupying other useful room in the car when out of use, all as more fully hereinafter described.

In the drawings, Figure 1 is a perspective view of one of the longitudinal seats as now in use in street railways showing my improvement applied thereto. Fig. 2 is a longitudinal section through a portion of the seat and through one of the auxiliary seats. Fig. 3 is a cross section on line $x\,x$ of Fig. 2, showing the seat raised in position as in use.

A is the ordinary longitudinal seat, such as is used in street cars at the present time. This seat is divided into sittings B, that is, places in which one person may be seated, by blocks C, which when turned on edge, as shown in Fig. 1, forms satisfactory arm rests engaged in sockets or notches D in the edge of the seat. These blocks are provided on one edge with grooves E in one end of which is pivoted the end of the standard F so arranged that the block may be turned into parallelism with the standard to form practically a continuation thereof when engaged in the notch D. The standard slidingly engages in a guide way G formed on the front of the seat and is provided with suitable means for locking it in its raised position, such for instance as the pin H, which in raising the standard runs in the slots I and is adapted to be turned at right angles to those slots at the top to rest upon the shoulders, J. In this position of the auxiliary seat it may be turned about its pivot on the standard to a horizontal position when the shoulder K thereon will rest against the side of the standard and hold the seat in that position as plainly shown in Fig. 3. Thus in the ordinary use of the car the blocks form the arm rests between the seats or simply divide the sittings and when the car is crowded the occupants of the car may raise the standard by taking hold of the blocks, when by turning it a half turn it may be locked in its elevated position and the seat turned to its horizontal position.

Experience has demonstrated that such a seat located between the sittings does not in any way interfere with the occupants of such sittings, and at the same time forms a reasonably comfortable seat for persons who otherwise would be obliged to stand in the aisle.

While I have shown this applied to longitudinal seats, it is obvious that it may be applied if desired for other seats, for instance at the ends of the ordinary car seats, such as used in railway cars and sometimes in street cars.

What I claim as my invention is—

1. In a car, the combination with the seats, of blocks extending above the seats and forming divisions between the sittings and means for vertically adjusting said blocks, and means converting them into auxiliary seats, substantially as described.

2. In a seat having a plurality of seatings, a division board between the seatings arranged on edge, a support for the board and an adjustable connection between the board and support whereby the board may be adjusted to present a flat upper surface, substantially as described.

3. In a seat, a division board, a support therefor, means for permitting the adjustment of the board to present its side upwardly, and means for retaining the board in its adjusted position, substantially as described.

4. In a car, the combination of the longitudinal seats having vertical guides between the sittings, of standards engaging therein, the seat C pivoted to the top of the standard, in a slot, or groove, and the pin H adapted to engage a shoulder beside the guide, substantially as described.

5. In a car, the combination of the longitudinal seats having notches between the sittings, the blocks C adapted to stand on edge, in said notches, the standards F entering a groove in the seats and to the top of which they are pivoted, means for holding the blocks horizontal at the top of the standard and means for holding the standard in its raised position, substantially as described.

In testimony whereof I affix my signature in presence of two witnesses.

JOHN KREHBIEL.

Witnesses:
   CHARLES E. FERRELL,
   GEORGE G. SOWDEN.